United States Patent
Chang (10) Patent No.: US 10,328,540 B2
(45) Date of Patent: Jun. 25, 2019

(54) SPEED CHANGE AUXILIARY DEVICE OF LATHE

(71) Applicant: KINGSAND MACHINERY LTD., Taichung (TW)

(72) Inventor: Chin-Feng Chang, Taichung (TW)

(73) Assignee: KINGSAND MACHINERY LTD., Taichung (TW)

( * ) Notice: Subject to any disclaimer, the term of this patent is extended or adjusted under 35 U.S.C. 154(b) by 0 days.

(21) Appl. No.: 15/675,776

(22) Filed: Aug. 13, 2017

(65) Prior Publication Data

US 2019/0047102 A1     Feb. 14, 2019

(51) Int. Cl.
| | |
|---|---|
| *F16H 7/14* | (2006.01) |
| *B23Q 5/14* | (2006.01) |
| *B23Q 5/20* | (2006.01) |
| *B27C 7/02* | (2006.01) |
| *B23Q 5/12* | (2006.01) |

(52) U.S. Cl.
CPC ............. *B23Q 5/142* (2013.01); *B23Q 5/20* (2013.01); *F16H 7/14* (2013.01); *B23Q 5/12* (2013.01); *B23Q 2705/062* (2013.01); *B23Q 2705/064* (2013.01); *B27C 7/02* (2013.01)

(58) Field of Classification Search
CPC ....... F16H 2007/0868; F16H 2007/088; B23Q 5/142; B23Q 5/20; B23Q 2705/064; B23Q 2705/062; B23Q 2705/06
USPC .......................... 474/119, 128, 129, 122, 123
See application file for complete search history.

(56) References Cited

U.S. PATENT DOCUMENTS

| | | | | | |
|---|---|---|---|---|---|
| 719,262 | A | * | 1/1903 | Ruth .......................... | F16H 7/22 474/128 |
| 749,863 | A | * | 1/1904 | Houseman ................ | F16H 7/22 474/128 |
| 1,422,809 | A | * | 7/1922 | Anderson ................ | F16H 7/129 474/133 |
| 2,341,992 | A | * | 2/1944 | Jarrett ....................... | F16H 7/14 474/114 |
| 2,368,848 | A | * | 2/1945 | Krueger .................... | F16H 7/14 451/311 |

(Continued)

FOREIGN PATENT DOCUMENTS

| | | | | |
|---|---|---|---|---|
| EP | 3135956 A1 | * | 3/2017 | ........... F16H 7/0827 |
| GB | 1175951 A | * | 1/1970 | ........... F16H 7/1281 |
| WO | WO 2010028263 A1 | * | 3/2010 | ............... F16H 7/14 |

*Primary Examiner* — Ryan C Rufo
(74) *Attorney, Agent, or Firm* — Raymond Y. Chan; David and Raymond Patent Firm (57) ABSTRACT

A speed change auxiliary device of a lathe is provided. A side chamber of the lathe is provided with a shaft seat and a bottom shaft seat at the top and bottom thereof. An auxiliary device is provided between the shaft seat and the bottom shaft seat. The auxiliary device includes a shaft. A spring, an eccentric block, an engaging member, a positioning nut, a rotary sleeve and a fixing block are fitted on the shaft. The rotary sleeve includes a handle. Two sides of an inner circumferential surface of the rotary sleeve have protrusions. The protrusions each have an upright surface and an upper guide bevel at two sides thereof. The fixing block is disposed on the bottom shaft seat. Two sides of a circumferential surface of the fixing block have recesses. The recesses each have a stop surface and a lower guide bevel at two sides thereof.

6 Claims, 11 Drawing Sheets

(56) References Cited

U.S. PATENT DOCUMENTS

| | | | | | |
|---|---|---|---|---|---|
| 2,618,163 | A | * | 11/1952 | Russell | F16H 7/14 |
| | | | | | 29/DIG. 105 |
| 2,664,757 | A | * | 1/1954 | Shaw | F16H 7/14 |
| | | | | | 474/27 |
| 3,479,894 | A | * | 11/1969 | Cofer | F16H 7/1281 |
| | | | | | 474/135 |
| 3,702,570 | A | * | 11/1972 | Stikkers | F16H 7/02 |
| | | | | | 474/113 |
| 4,222,280 | A | * | 9/1980 | Stewart | F16H 7/02 |
| | | | | | 244/54 |
| 4,571,221 | A | * | 2/1986 | Isobe | F16H 7/14 |
| | | | | | 474/101 |
| 4,604,079 | A | * | 8/1986 | Parrish | F16H 7/14 |
| | | | | | 248/666 |
| 4,618,336 | A | * | 10/1986 | Isobe | F16H 7/14 |
| | | | | | 474/113 |
| 2005/0079939 | A1 | * | 4/2005 | Simmons | F16H 7/14 |
| | | | | | 474/113 |
| 2009/0062046 | A1 | * | 3/2009 | Lindemann | F16H 7/1263 |
| | | | | | 474/101 |
| 2009/0209379 | A1 | * | 8/2009 | Nichols, Jr. | B27C 7/00 |
| | | | | | 474/112 |
| 2011/0165980 | A1 | * | 7/2011 | Hoeting | F16H 7/14 |
| | | | | | 474/114 |
| 2011/0306450 | A1 | * | 12/2011 | Chou | F16H 7/14 |
| | | | | | 474/114 |
| 2015/0369346 | A1 | * | 12/2015 | Sisodia | F16H 7/1209 |
| | | | | | 474/135 |

* cited by examiner

SPEED CHANGE AUXILIARY DEVICE OF LATHE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a speed change auxiliary device of a lathe, and more particularly to an auxiliary device for changing the position of a transmission belt by turning a rotary sleeve with a handle.

Description of Related Arts

Figure 1:
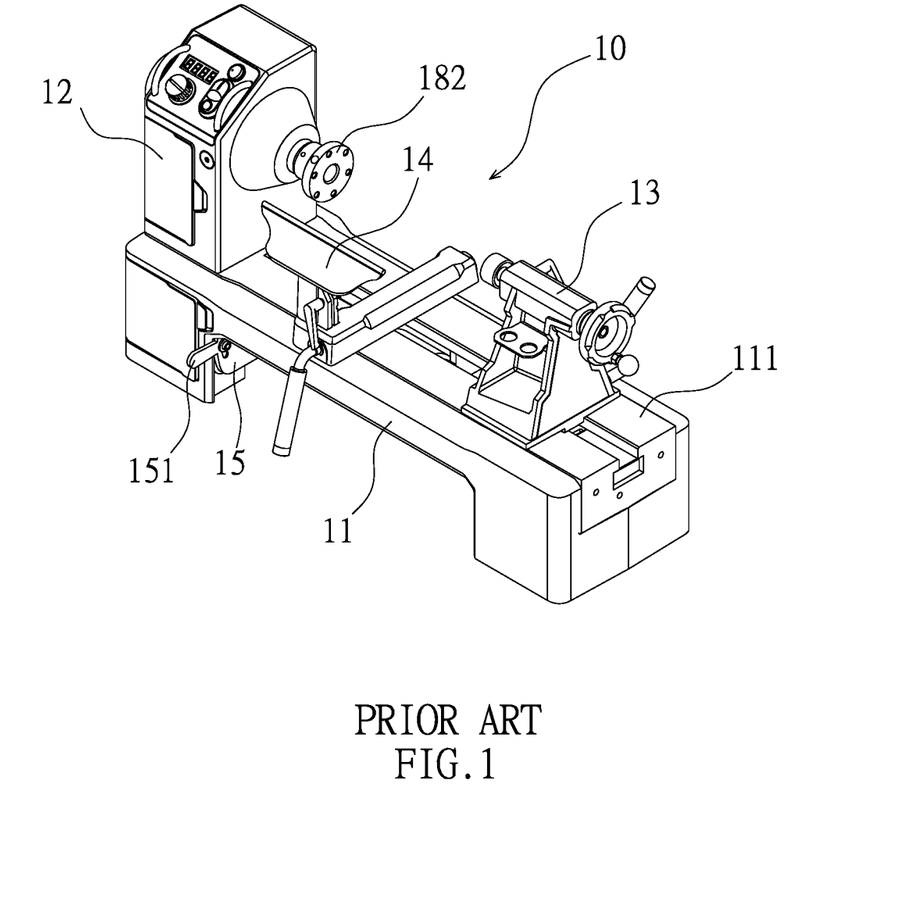
FIG. 1 is a perspective view of a conventional woodworking lathe.
Figure 2:
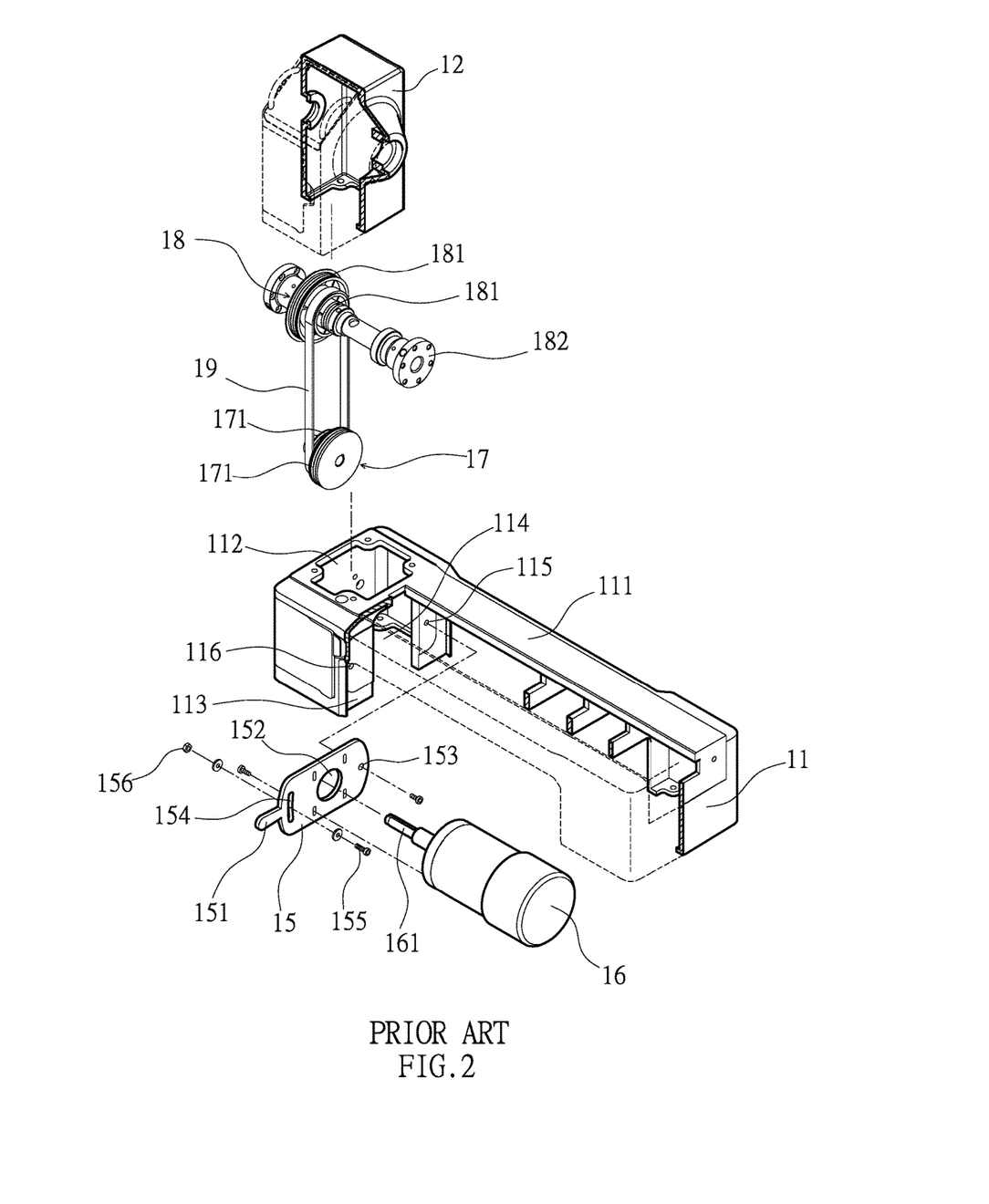
FIG. 2 is an exploded view of the conventional woodworking lathe.
Figure 3:
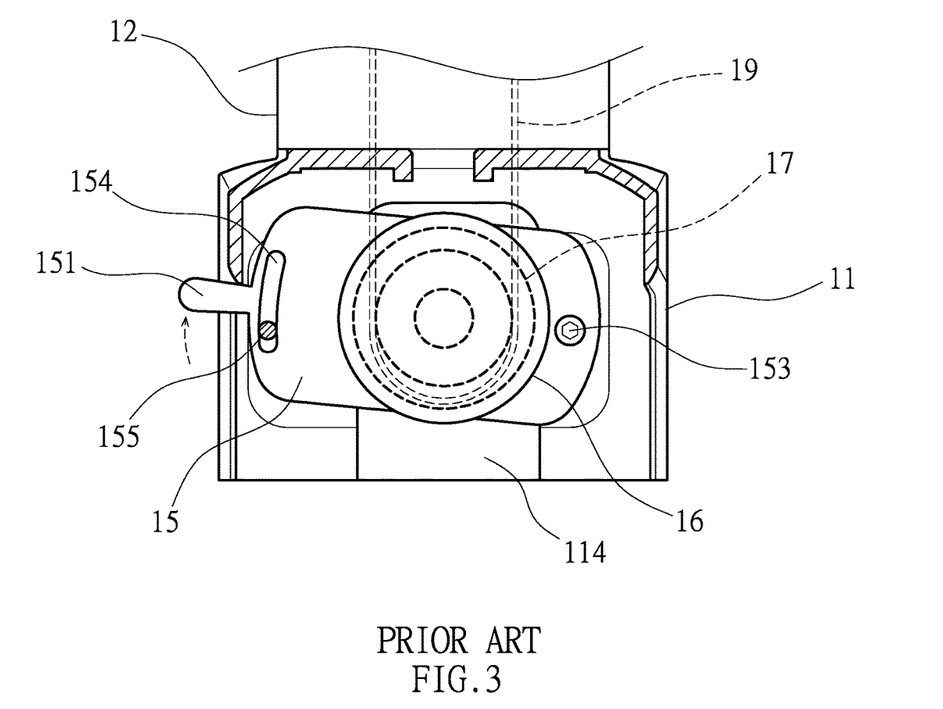
FIG. 3 is a side sectional view of the conventional woodworking lathe, showing that the connecting plate is lifted up to loosen the transmission belt.
Figure 4:
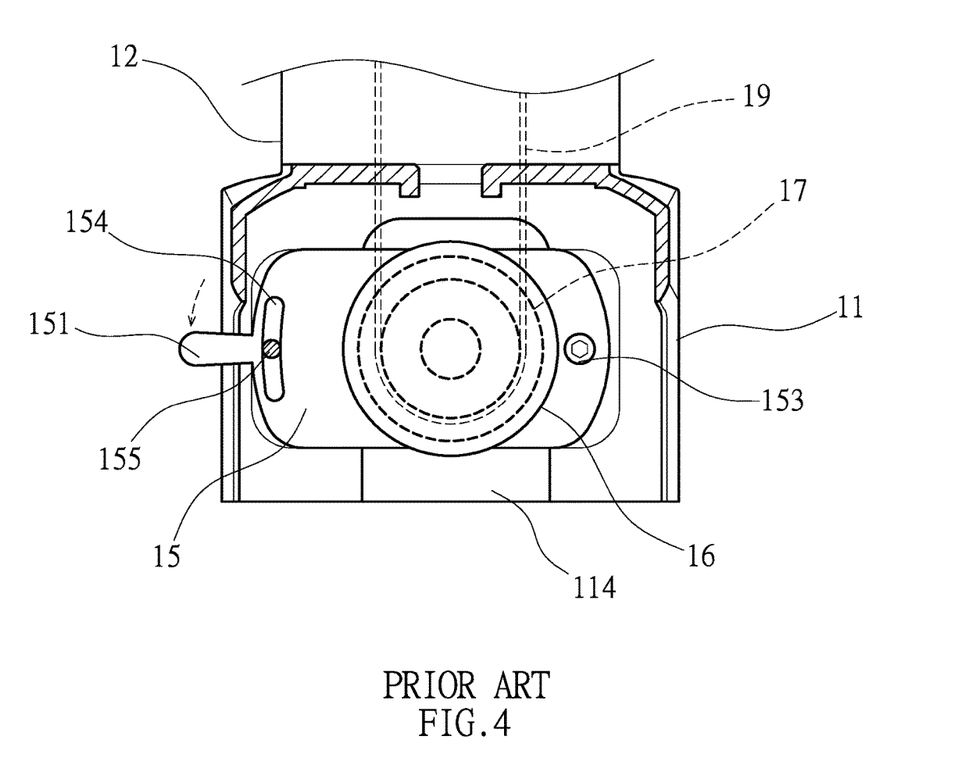
FIG. 4 is a side sectional view of the conventional woodworking lathe, showing that the connecting plate is pressed down to tighten the transmission belt.
Figure 5:
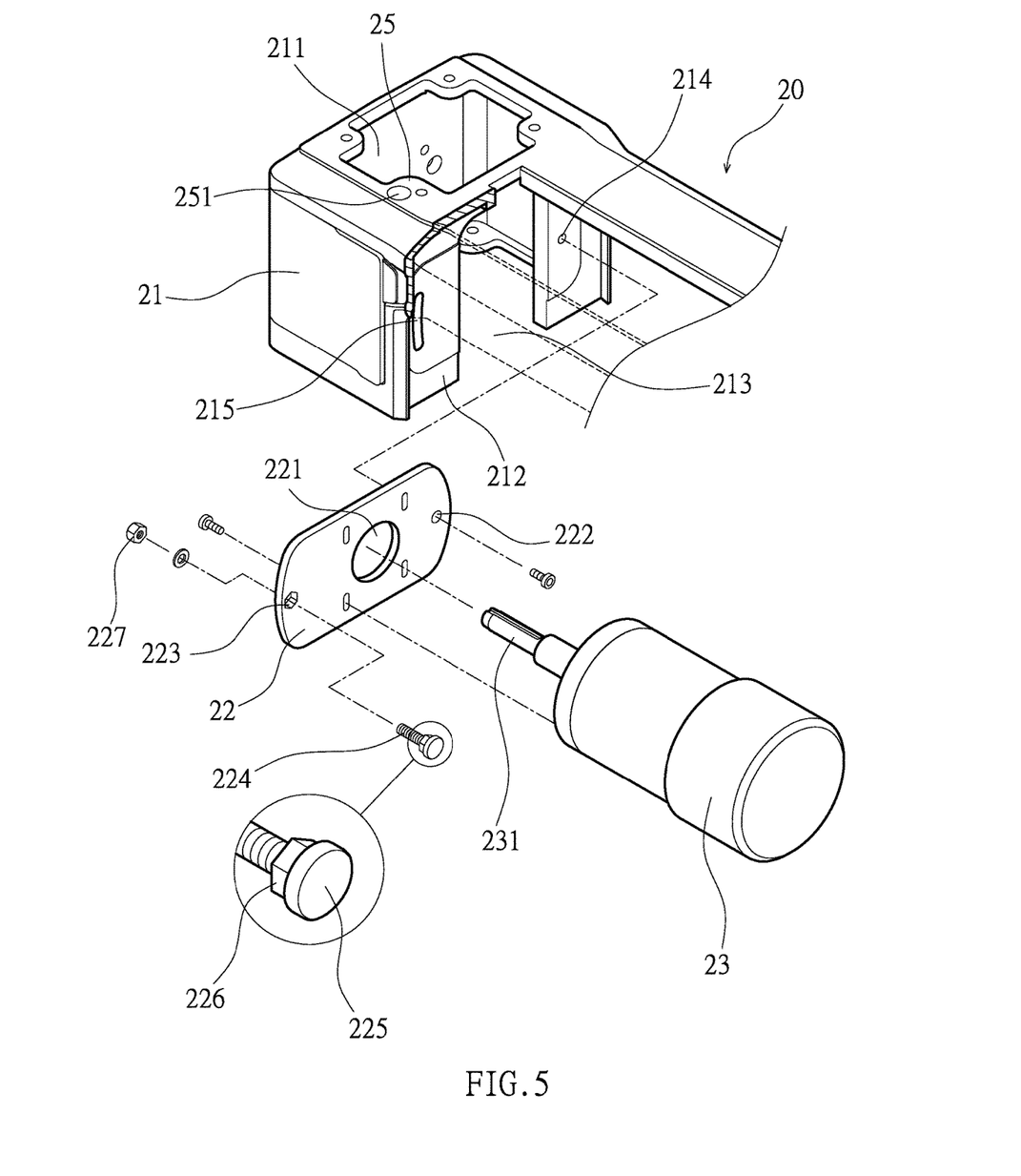
FIG. 5 is an exploded view of the connecting plate of the present invention.
Figure 6:
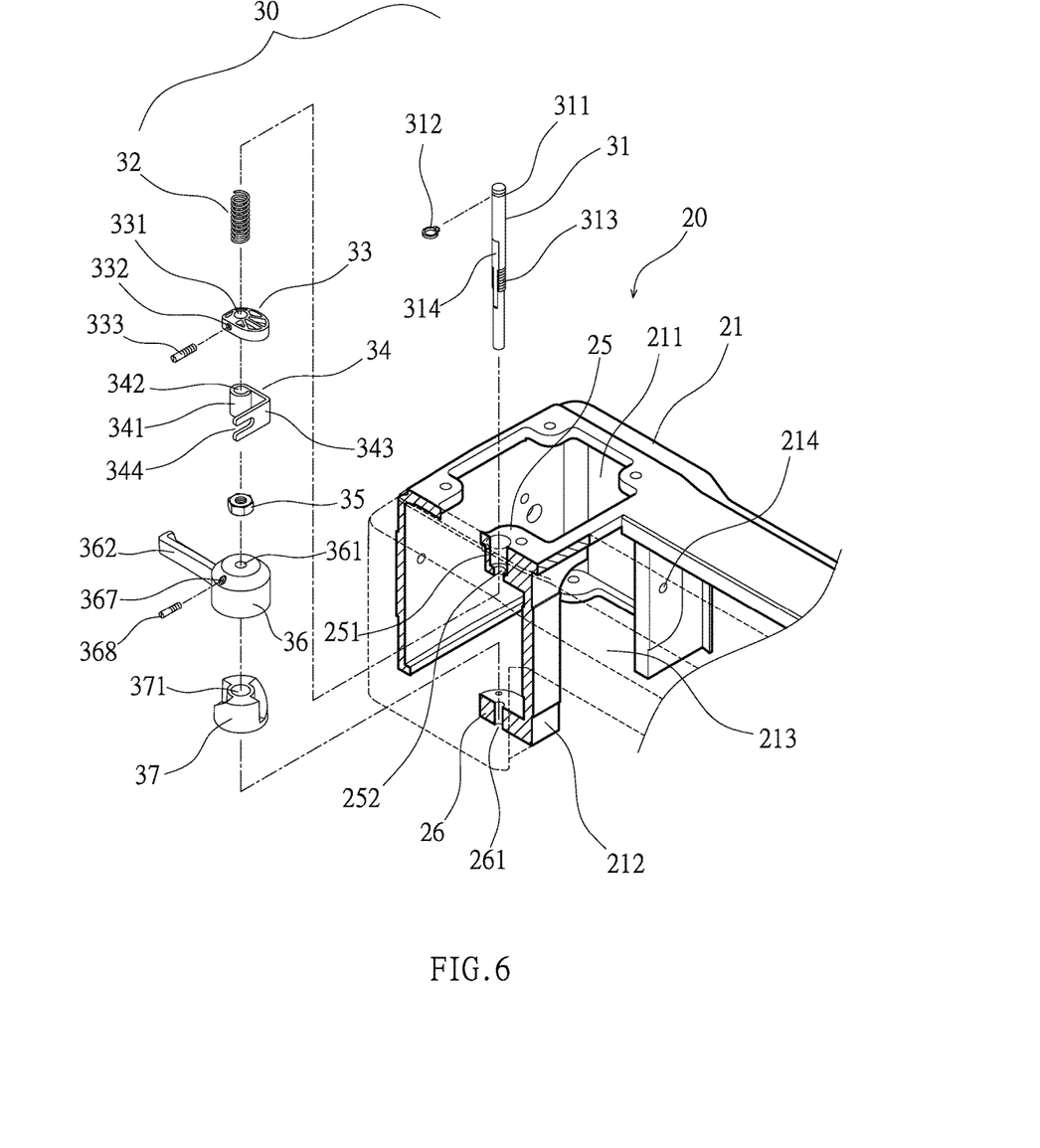
FIG. 6 is an exploded view of the auxiliary device of the present invention.
Figure 7:
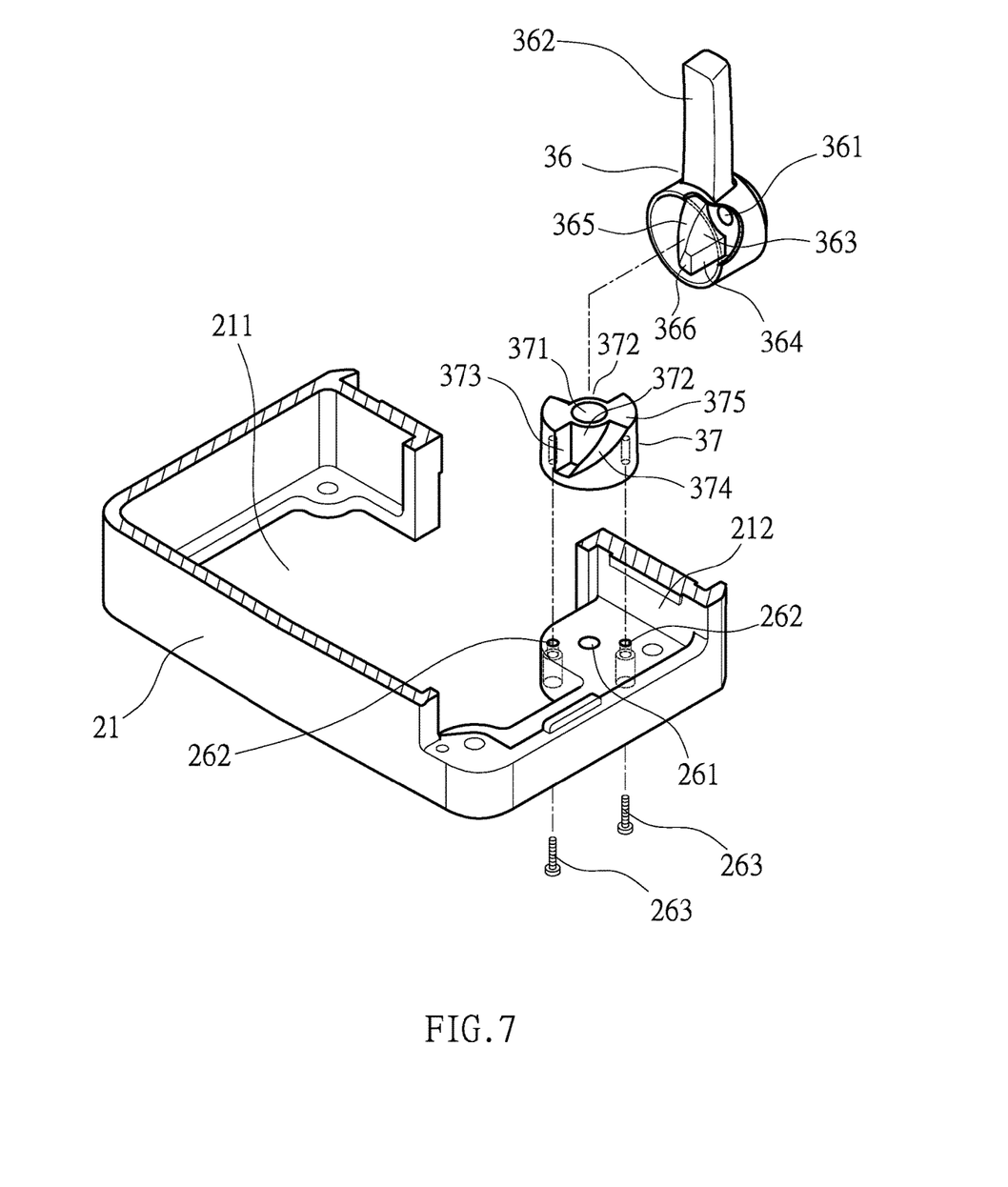
FIG. 7 is a perspective view of the rotary sleeve and the fixing block of the present invention.

As shown in FIG. 1 to FIG. 4, a conventional woodworking lathe comprises a base 11, a headstock 12 fixed to a top surface 111 of the base 11, a tailstock 13 which is disposed on the top surface 111 and movable lengthwise, and a blade holder 14 which is disposed on the top surface 111 and rotatable. The base 11 has a side chamber 112 under the headstock 12. The side chamber 112 has a side plate 113. The side plate 113 has a through groove 114 at a central portion thereof, a side shaft hole 115 close to one side of the through groove 114, and a side through hole 116 close to another side of the through groove 114. One side of the side plate 113, opposite to the side chamber 112, is provided with a connecting plate 15. The connecting plate 15 is integrally formed with a handle 151. The connecting plate 15 has a motor shaft hole 152, a plate shaft hole 153 at one side of the motor shaft hole 152, and a curved slot 154 at another side of the motor shaft hole 152. The connecting plate 15 is connected with a motor 16. The motor 16 has a rotary shaft 161 inserted through the motor shaft hole 152 of the connecting plate 15. The plate shaft hole 153 of the connecting plate 15 is pivotally connected with the side shaft hole 115. A screw 155 passes through the curved slot 154 and the side through hole 116, and then a nut 156 is screwed to the other end of the screw 155. The rotary shaft 161 of the motor 16 is inserted into the side chamber 112 via the through groove 114. The rotary shaft 116 is connected with a driving wheel set 17 consisting of driving wheels 171 with different diameters. The inside of the headstock 12 is provided with a driven wheel set 18 located above the driving wheel set 17. The driven wheel set 18 consists of driven wheels 181 with different diameters. The driven wheels 181 are arranged according to their diameters in the revere order of the driving wheels 171. The driven wheel set 18 has an output shaft 182 extending out of the headstock 12. A transmission belt 19 is wound around the driving wheel set 17 and the driven wheel set 18, thereby enabling the output shaft 182 to drive a workpiece (not shown) to rotate. When the nut 156 is unscrewed to loosen the connecting plate 15 from the side plate 113, the handle 151 of the connecting plate 15 can be pulled up and down by means of the screw 155 to slide within the curved slot 154. When the handle 151 is pulled upward, the driving wheel set 17 ascends to loosen the transmission belt 19 wound around the driving wheel set 17 and the driven wheel set 18 (as shown in FIG. 3). The winding position of the transmission belt 19 may be adjusted for changing the rotational speed of the output shaft 182. When the transmission belt 19 is set on a small-diameter driving wheel 171 of and a large-diameter driven wheel 181, the output shaft 182 rotates slowly to achieve the purpose of changing the speed of the lathe 10. After the winding position of the transmission belt 19 is changed, the transmission belt 19 is temporarily positioned by the gravity of the connecting plate 15, the motor 16 and the driving wheel set 17. The handle 151 is pressed down and the screw 155 is screwed (as shown in FIG. 4), the nut 156 locks the curved slot 154 of the connecting plate 15 so that the transmission belt 19 does not slip during transmission. However, the above-mentioned structure has the following problems:

1. In order to change the winding position of the transmission belt 19, the operator has to lift the connecting plate 15, the motor 16, and the driving wheel set 17 with one hand and changes the winding position of the transmission belt 19 with the other hand. This way is inconvenient. If the handle 151 inadvertently slips down when the winding position of the transmission belt 19 is changed, the connecting plate 15, the motor 16, and the driving wheel set 17 may descend to hurt the operator.

2. After the winding position of the transmission belt 19 is changed, the handle 151 is pressed down to tighten the transmission belt 19. However, the applied force is different depending on the operator's experience, and the screw 155 and the nut 156 need to be screwed tightly. It is difficult to ensure that the transmission belt 19 is indeed tightened without slipping.

Accordingly, the inventor of the present invention has devoted himself based on his many years of practical experiences to solve these problems.

SUMMARY OF THE PRESENT INVENTION

The primary object of the present invention is to solve the aforesaid problems and to provide a speed change auxiliary device of a lathe. A side chamber is provided with an auxiliary device. The auxiliary device includes a shaft. A spring, an block, an engaging member, a positioning nut, a rotary sleeve and a fixing block are fitted on the shaft in sequence. The inner circumferential surface of the rotary sleeve is provided with a protrusion. The protrusion has an upper guide bevel. The fixing block has a recess. The recess has a lower guide bevel. The upper guide bevel and the lower guide bevel are engagable with each other. When the handle is turned to rotate the rotary sleeve, the rotary sleeve ascends or descends along the bevel to drive the driving wheel set to loosen or tighten a transmission belt, thereby achieving a convenient and rapid speed change for the lathe.

DETAILED DESCRIPTION OF THE PREFERRED EMBODIMENT

Embodiments of the present invention will now be described, by way of example only, with reference to the accompanying drawings.

Referring to FIG. 5 to FIG. 11, a speed change auxiliary device of a lathe 20 comprises a base 21. The base 21 has a side chamber 211. A side plate 212 of the side chamber 211 has a through groove 213 at a central portion thereof, a side shaft hole 214 close to one side of the through groove 213, and a curved slot 215 close to another side of the through groove 213. One side of the side plate 212, opposite to the side chamber 211, is provided with a connecting plate 22. The connecting plate 22 has a motor shaft hole 221, a plate shaft hole 222 at one side of the motor shaft hole 221, and a polygonal hole 223 at another side of the motor shaft hole 221. The motor 23 has a rotary shaft 231 coupled to the connecting plate 22. The rotary shaft 231 is inserted through the motor shaft hole 221 of the connecting plate 22. The plate shaft hole 222 of the connecting plate 22 is pivotally connected with the side shaft hole 214, and a screw 224 passes through the polygonal hole 223 and the curved slot 215. One end of the screw 224 has a round head portion 225 which abuts a polygonal portion 226 facing a rod body of the screw 224 and having a width less than the diameter of the round head portion 22. The polygonal portion 226 is fitted into the polygonal hole 223 to restrict rotation of the screw 224. The round portion 225 is retained outside the polygonal hole 223. Another end of the screw 224 is inserted into the side chamber 211. The rotary shaft 231 of the motor 23 is inserted into the side chamber 211 via the through groove 213. The rotary shaft 231 is connected with a driving wheel set 17. The top of the side chamber 211 is provided with a shaft seat 25 having an accommodation trough 251 and a perforation 252 in the accommodation through 251. The bottom of the side chamber 211 is provided with a bottom shaft seat 26 having a through hole 261. The through hole 261 corresponds in position to the perforation 252 and is under the perforation 252. An auxiliary device 30 is provided between the shaft seat 25 and the bottom shaft seat 26. The auxiliary device 30 includes a shaft 31, and a spring 32, an block 33, an engaging member 34, a positioning nut 35, a rotary sleeve 36 and a fixing block 37 are fitted on the shaft 31 in sequence. An outer circumference of a top end of the shaft 31 is formed with an annular groove 311. The annular groove 311 is provided with a C-shaped snap ring 312. The shaft 31 has a threaded section 313. The shaft 31 further has a flat portion 314 at one side thereof. The shaft 31 is inserted into the accommodation trough 251 of the shaft seat 25 to pass through the perforation 252. The C-shaped snap ring 312 enables the top end of the shaft 31 to be retained above the through hole 252. One end of the spring 32 abuts against the bottom of the shaft seat 25, and another end of the spring 32 abuts against the block 33. The block 33 has an eccentric shaft hole 331 for insertion of the shaft 31. One side of the eccentric shaft hole 331 is provided with a first side screw hole 332. A first locking pin 333 is screwed into the first side screw hole 332 to hold against the flat portion 314 of the shaft 31 so that the shaft 31 and the block 33 are assembled and positioned. A distal end of the block 33 may lean against the side plate 212. The engaging member 34 has a shaft portion 341. The shaft portion 341 has a shaft portion through hole 342 for insertion of the shaft 31. The shaft portion 341 is provided with a horizontal L-shaped extension plate 343. A distal end of the extension plate 343 has a horizontal engaging groove 344. The engaging groove 344 is engaged with the screw 224. The screw 224 is locked by a nut 227 to secure the connecting plate 22 and the extension plate 343. The positioning nut 35 is screwedly connected to the threaded section 313 of the shaft 31 so that the engaging member 34 is positioned on the shaft 31. The shaft 31 can be moved up and down through the spring 32 but cannot be separated from the accommodation trough 251. The rotary sleeve 36 is in the form of a circular cover. The rotary sleeve 36 has a top through hole 361 for insertion of the shaft 31. A handle 362 is provided at one side of an outer circumferential surface of the rotary sleeve 36. Two sides of an inner circumferential surface of the rotary sleeve 36 are provided with inverse triangular protrusions 363, respectively. Each protrusion 363 has an upright surface 364 at one side thereof, an upper guide bevel 365 at another side thereof, and a bottom flat surface 366. The upper guide bevel 365 has a lowermost point adjacent to the bottom flat surface 366. One side of the rotary sleeve 36 is provided with a second side screw hole 367. A second locking pin 368 is screwed into the second side screw hole 367 to hold against the flat portion 314 of the shaft 31 so that the shaft 31 and rotary sleeve 36 are assembled and positioned. The fixing block 37 is in the form of a circular block disposed on the bottom shaft seat 26. The bottom shaft seat 26 has at least two locking holes 262. A bolt 23 is inserted from the bottom of the bottom shaft seat 26 to pass through a respective one of the locking holes 262, and is screwed to the bottom of the fixing block 37. The fixing block 37 has a central through hole 371 to communicate with the through hole 261. Two sides of a circumferential surface of the fixing block 37 are provided with triangular recesses 372, respectively. The recess 372 has a stop surface 373 at one side thereof and a lower guide bevel 374 at another side thereof. The lower guide bevel 374 has an uppermost point adjacent to a top flat surface 375. The rotary sleeve 36 is rotatably fitted on the fixing block 37 so that the protrusions 363 and the recesses 372 can be fitted to each other. The upright surface 364 is in contact with the stop surface 373. The upper guide bevel 365 is engageable with the lower guide bevel 374. The bottom end of the shaft 31 passes through the central through hole 371 and is inserted in the through hole 261 of the bottom shaft seat 26. When the handle 362 of the rotary sleeve 36 is turned counterclockwise, the upper guide bevel 365 is lifted upward along the lower guide bevel 374 so that the shaft 31, the block 33, the engaging member 34, the positioning nut 35 and the rotary sleeve 36 are simultaneously lifted. The engaging groove 344 of the engaging member 34 enables the screw 224 to be lifted up within the curved slot 215, such that the connecting plate 22 and the driving wheel set 17 ascend to loosen the transmission belt 19 so that the speed of the lathe 20 can be changed to achieve a simple and rapid speed change.

Figure 8:
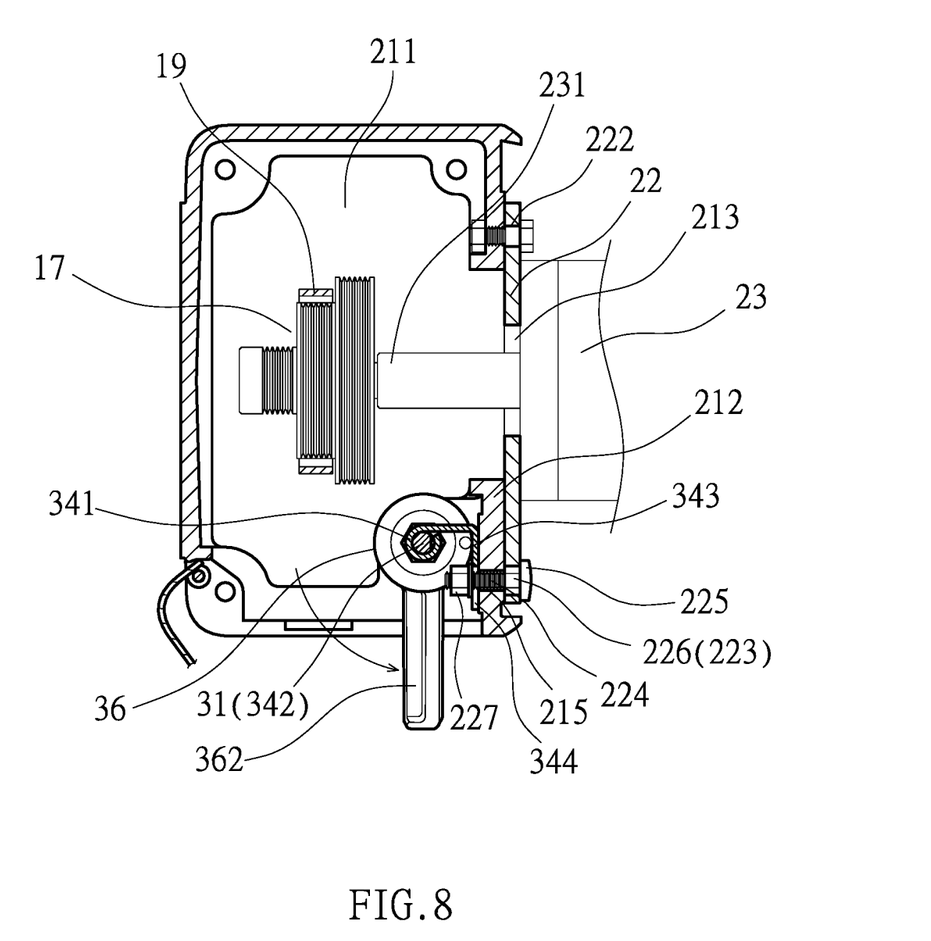
FIG. 8 is a top sectional view of the present invention, showing that the driving wheel set is lifted up to loosen the transmission belt.
Figure 9:
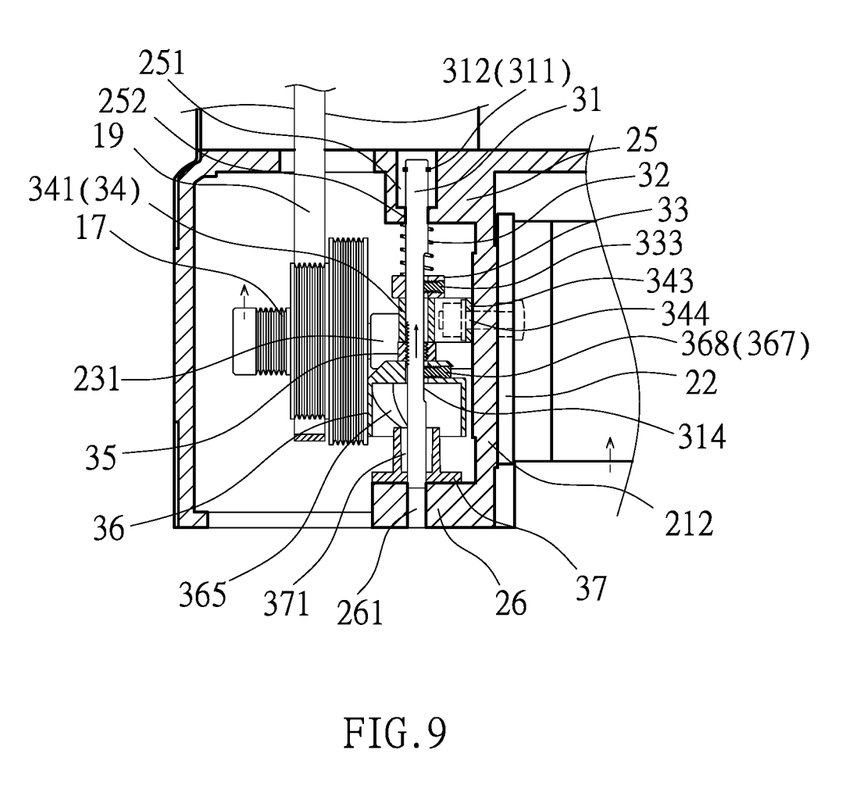
FIG. 9 is a front sectional view of the present invention, showing that the driving wheel set is lifted up to loosen the transmission belt.
Figure 10:
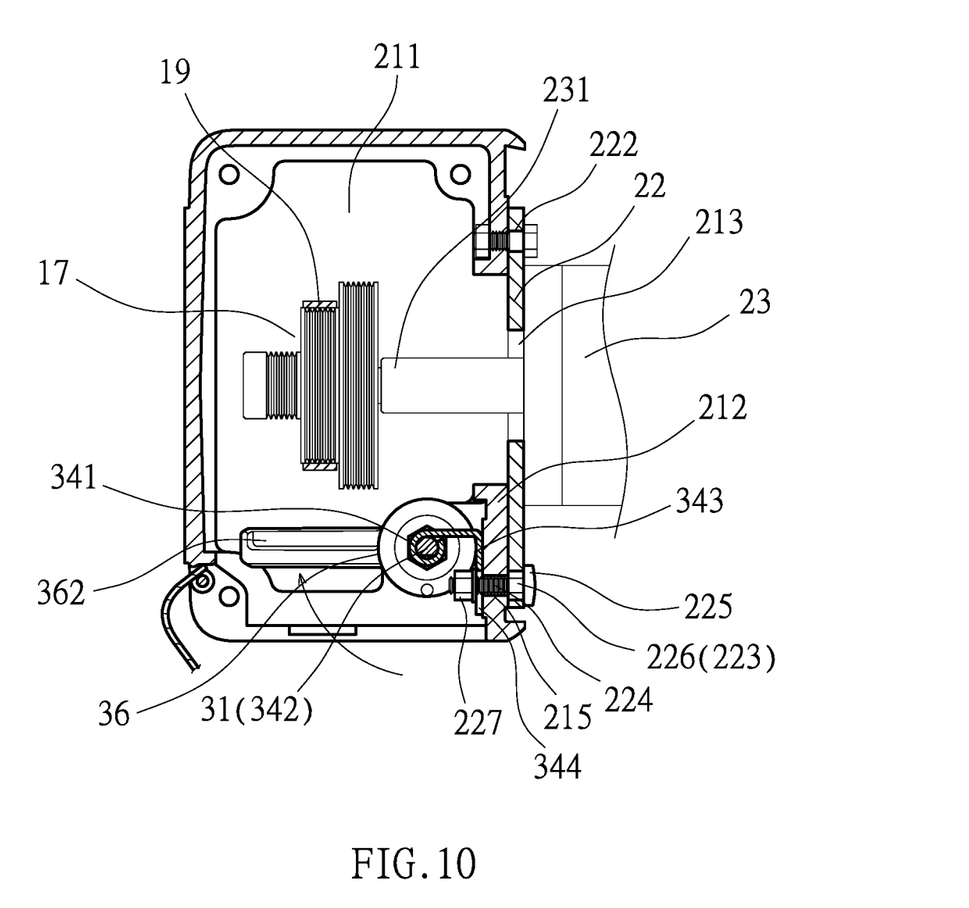
FIG. 10 is a top sectional view of the present invention, showing that the driving wheel set is pressed down to tighten the transmission belt.
Figure 11:
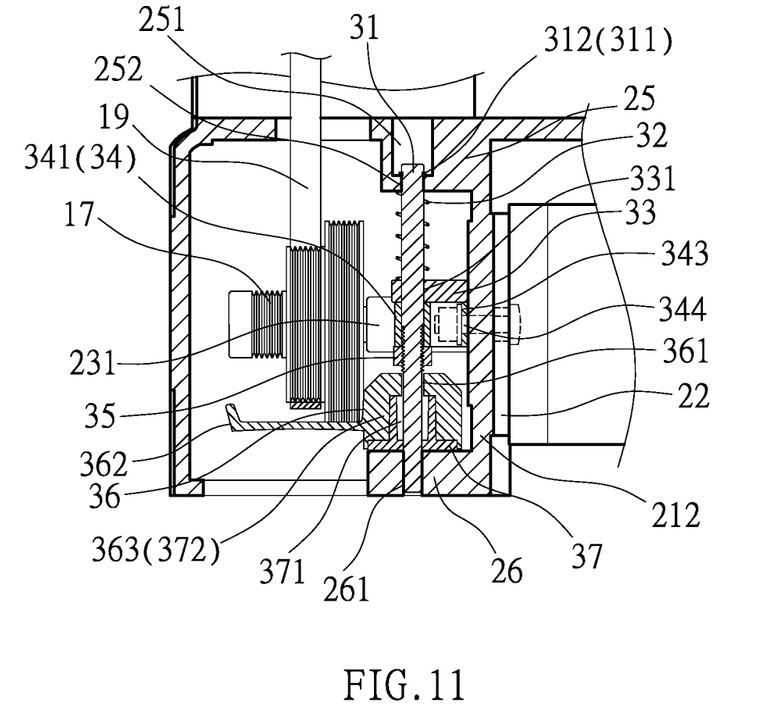
FIG. 11 is a front sectional view of the present invention, showing that the driving wheel set is pressed down to tighten the transmission belt.

The assembly, function, and details of the aforesaid embodiment are described hereinafter. Please refer to FIG. 5 to FIG. 11, when the transmission belt 19 wound around the driving wheel set 17 and the driven wheel set (not shown) is in a running state, one end of the spring 32 leans against the shaft seat 25, and the other end of the spring 32 leans against the block 33, and the block 33 leans against the side plate 212 in a tensioned state, such that the driving wheel set 17 can actually rotate the driven wheel without slipping. One end of the screw 224 is restricted by the polygonal hole 223 without being rotated, so that the nut 227 can be easily screwed. The screw 224 is locked by the nut 227, but is in a non-tightened condition. The nut 227 serves to prevent the screw 224 from disengaging from the curved slot 215 so that the screw 224 can be moved up and down within the curved slot 215. When the lathe 20 is to be shifted and the position of the transmission belt 19 is to be changed, the handle 362 of the rotary sleeve 36 is first turned counterclockwise. The upper guide bevel 365 of the protrusion 363 is lifted relative to the lower guide bevel 374, meanwhile, the shaft 31, the block 33 and the engaging member 34 are linked to ascend so that the protrusion 363 disengages from the recess 372. Finally, the bottom flat surface 366 is against the top flat surface 375 (as shown in FIG. 8 and FIG. 9). The rotary sleeve 36 props up the shaft 31, the block 33, and the engaging member 34 to be temporarily positioned and hold, so that the connecting plate 22, the motor 23 and the driving wheel set 17 can be supported without the need of great effort. The spring 32 is compressed by the ascent of the block 33 to produce an elastic force, so that the counterforce of the spring 32 applies to the block 33 to press the shaft 31 and the rotary sleeve 36, and the bottom flat surface 366 exerts a force on the top flat surface 375 to increase the frictional force to achieve a more stable and erroneous operation of the rotary sleeve 36 and a more secure effect. The shaft 31 is rotated according to the rotational direction of the rotary sleeve 36, and the distal end of the block 33 is turned away from the side plate 212, but the shaft portion 341 of the engaging member 34 is idling. The screw 224 is lifted through the engaging groove 344. The connecting plate 22 is pivoted about the plate shaft hole 222, and the screw 224 is lifted up at an angle within the curved slot 215. The motor 23 and the driving wheel set 17 are also lifted, and the transmission belt 19 is loosened, and the winding position of the transmission belt 19 can be changed to achieve a convenient and quick speed change. Further, after the winding position of the transmission belt 19 is change to complete the shift demand, the handle 362 is turned reversely (clockwise) to disengage the bottom flat surface 366 of the rotary sleeve 36 from the top flat surface 375 of the fixing block 37. The upper guide bevel 365 is tangent to the lower guide bevel 374 again and is slid down by rotation, so that the protrusion 363 and the recess 372 are fitted to each other again (as shown in FIG. 10 and FIG. 11). The upright surface 364 is in contact with the stop surface 373, and the handle 362 is positioned and received in the side chamber 211. Meanwhile, the shaft 31, the block 33 and the engaging member 34 are linked to descend. The block 33 is biased by the spring 32 to apply a downward force so that the screw 34 is moved down through the engaging groove 344 of the extension plate 343 of the engaging member 34. The connecting plate 22 is pivoted about the plate shaft hole 222, and the screw 224 is turned down at an angle within the curved slot 215. The motor 23 and the driving wheel set 17 descend. The transmission belt 19 is tightened by means of the elasticity of the spring 32, meanwhile, the block 33 is rotated for its distal end to lean against the side plate 212 again. The handle 362 has a better positioning effect and won't be rotated wrongly. There is no need to use a tool for a speed change. It is possible for an operator without any work experience to tighten the transmission belt 19.

In addition, according to the technical means described above, as to the upright surface 364 and the upper guide bevel 365 at the two sides of the protrusion 363 of the rotary sleeve 36 and the stop surface 373 and the lower guide bevel 374 at the two sides of the recess 372 of the fixing block 37, their locations can be interchangeable. When the handle 36 is turned clockwise, the rotary sleeve 36 ascends. When the handle 362 is turned counterclockwise, the rotary sleeve 36 descends. This modification is a simple replacement of the technical feature of the present invention and belongs to the category of the equivalent structure of the present invention.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A speed change auxiliary device of a lathe, comprising a base, the base having a side chamber, a side plate of the side chamber having a through groove at a central portion thereof, the side plate of the side chamber further having a side shaft hole close to one side of the through groove, and a curved slot close to another side of the through groove; one side of the side plate, opposite to the side chamber, being provided with a connecting plate, the connecting plate having a plate shaft hole at one side thereof and a polygonal hole at another side thereof, the plate shaft hole being pivotally connected with the side shaft hole, a screw being inserted in the polygonal hole and the curved slot, an end of the screw having a polygonal portion fitting in the polygonal hole while another end of the screw extending into the side chamber, the connecting plate being connected with a motor, a rotary shaft of the motor, which passes through the through groove, being inserted into the side chamber and connected with a driving wheel set; a top of the side chamber being provided with a shaft seat, a bottom of the side chamber being provided with a bottom shaft seat, an auxiliary device being provided between the shaft seat and the bottom shaft seat, the auxiliary device including a shaft, a spring, a block, an engaging member, a positioning nut, a rotary sleeve and a fixing block being fitted on the shaft in sequence; the shaft having a threaded section, the shaft being inserted into the shaft seat, a top end of the shaft forming an annular groove which is provided with a C-shaped snap ring enabling the top end of the shaft to be retained above the shaft seat; one end of the spring abutting against a bottom of the shaft seat, another end of the spring abutting against the block; the block and the shaft being assembled and connected together, a distal end of the block being able to lean against the side plate to have a contact with the side plate; the engaging member having a shaft portion and an extension plate, the shaft portion having a shaft portion through hole for insertion of the shaft, the shaft portion being connected with the extension plate, a distal end of the extension plate having an engaging groove, the engaging groove being engaged with the screw, the screw being locked by a nut to secure the connecting plate and the extension plate; the positioning nut being screwedly connected to the threaded section of the shaft so that the engaging member is positioned on the shaft; the rotary sleeve being pivotally connected to the shaft, a handle being provided at one side of an outer circumferential surface of the rotary sleeve; two sides of an inner circumferential surface of the rotary sleeve being provided with protrusions respectively, the protrusions each having an upright surface at one side thereof, an upper guide bevel at another side thereof, and a bottom flat surface, the upper guide bevel having a lowermost point adjacent to the bottom flat surface; the fixing block being disposed on the bottom shaft seat, two sides of a circumferential surface of the fixing block being provided with recesses respectively, the recesses each having a stop surface at one side thereof and a lower guide bevel at another side thereof, the lower guide bevel having an uppermost point adjacent to a top flat surface of the fixing block; the rotary sleeve being rotatably fitted on the fixing block so that the protrusions and the recesses are fitted to each other, the upright surface being in contact with the stop surface, the upper guide bevel being engageable with the lower guide bevel, a bottom end of the shaft passing through the fixing block and the bottom shaft seat.

2. The speed change auxiliary device of the lathe as claimed in claim 1, wherein the shaft seat has an accommodation trough and a perforation in the accommodation trough, the bottom shaft seat has a through hole, the through hole corresponds in position to the perforation and is under the perforation; the shaft is inserted in the accommodation trough to pass through the perforation, the snap ring at the top end of the shaft is retained above the perforation of the shaft seat; the fixing block has a central through hole to communicate with the through hole of the bottom shaft seat, and the bottom end of the shaft passes through the central through hole and is inserted in the through hole of the bottom shaft seat.

3. The speed change auxiliary device of the lathe as claimed in claim 1, wherein one end of the screw has a round head portion which abuts the polygonal portion having a width less than a diameter of the round head portion, and the polygonal portion is fitted into the polygonal hole so that the round portion is stopped outside the polygonal hole.

4. The speed change auxiliary device of the lathe as claimed in claim 1, wherein the shaft further has a flat portion at one side thereof, one side of the block has a first side screw hole, and a first locking pin is screwed into the first side screw hole to hold against the flat portion of the shaft so that the shaft and the block are assembled and positioned.

5. The speed change auxiliary device of the lathe as claimed in claim 4, wherein one side of the rotary sleeve has a second side screw hole, a second locking pin is screwed into the second side screw hole to hold against the flat portion of the shaft so that the shaft and rotary sleeve are assembled and positioned.

6. The speed change auxiliary device of the lathe as claimed in claim 1, wherein the bottom shaft seat has at least two locking holes, and a bolt is inserted from a bottom of the bottom shaft seat to pass through a respective one of the locking holes and screwed to a bottom of the fixing block.

* * * * *